United States Patent [19]
Weaver

[11] Patent Number: 5,300,531
[45] Date of Patent: Apr. 5, 1994

[54] PLASTIC SKIN CLADDED POLYURETHANES HAVING IMPROVED SURFACE APPEARANCE

[75] Inventor: Laura B. Weaver, Lake Jackson, Tex.

[73] Assignee: The Dow Chemical Company, Midland, Mich.

[21] Appl. No.: 998,338

[22] Filed: Dec. 30, 1992

[51] Int. Cl.$^5$ .............................................. C08G 18/14
[52] U.S. Cl. .................................... 521/51; 528/74.5; 427/373; 428/317.1
[58] Field of Search ................ 521/51, 167; 528/74.5, 528/78; 427/373, 393.5; 428/317.1, 317.3, 317.5, 317.7, 319.3, 319.7, 319.9

[56] References Cited

U.S. PATENT DOCUMENTS

| | | |
|---|---|---|
| 3,489,698 | 1/1970 | Morehouse . |
| 3,726,952 | 4/1973 | Boden et al. . |
| 3,993,576 | 11/1976 | Barron . |
| 3,993,606 | 11/1976 | von Bonin et al. . |
| 4,058,492 | 11/1977 | von Bonin et al. . |
| 4,111,861 | 9/1978 | Godlewski . |
| 4,220,727 | 9/1980 | Godlewski . |
| 4,246,364 | 1/1981 | Koehler et al. . |
| 4,374,222 | 2/1983 | Meyer . |
| 4,442,236 | 4/1984 | Rasshofer et al. . |
| 4,444,916 | 4/1984 | Grube et al. . |
| 4,451,425 | 5/1984 | Meyer . |
| 4,485,032 | 11/1984 | Olstowski et al. . |
| 4,529,744 | 7/1985 | Wood . |
| 4,575,518 | 3/1986 | Rasshofer et al. . |
| 4,579,877 | 4/1986 | Goel et al. . |
| 4,755,321 | 7/1988 | Moss et al. . |
| 4,784,904 | 11/1988 | Wood et al. . |
| 4,876,019 | 10/1989 | Meyer et al. . |
| 4,895,879 | 1/1990 | Nelson et al. . |

FOREIGN PATENT DOCUMENTS 2148786 10/1982 United Kingdom .

OTHER PUBLICATIONS

"Amphiphilic Segmented Polyurethanes as Susrfac Modifying Additives" by Maria Kober and Bengt Wesslen in *J. of Polymer Science: Part A: Polymer Chemistry*, vol. 30, pp. 1061-1070 (1992).

Primary Examiner—Maurice J. Welsh

[57] ABSTRACT

Certain fatty acid amides can be included in plastic skin clad polyurethane formulations to increase adhesion between the plastic skin and the polyurethane. These adhesion improvers can decrease or prevent blister formation in plastic skin clad polyurethanes. Additionally, the adhesion improvers can compatibilize certain extenders with base polyols and improve mold release properties.

20 Claims, No Drawings

PLASTIC SKIN CLADDED POLYURETHANES HAVING IMPROVED SURFACE APPEARANCE

BACKGROUND OF THE INVENTION

The present invention relates to thermoplastic or thermoset skin cladded polyurethanes having an improved surface appearance. The present invention particularly relates to thermoplastic skin cladded polyurethane foams having an improved surface appearance.

Polyurethane based polymers have long been known to be useful in preparing many products. For example, rigid polyurethane foam can be used in products such as pipe insulation, flotation devices and appliance insulation. Flexible polyurethane foam can be use in automotive seat cushions, toys and furniture manufacture. Semi-rigid polyurethane foam can be used to prepare products such as automotive headrests, dashboards and armrests. Reinforced rigid polyurethane foams are increasingly being used to prepare lightweight automotive door panels, seat backs and the like.

Polyurethane surfaces are sometimes neither suitable nor desirable for certain applications. For example, a polyurethane foam surface may not be durable enough or not aesthetically appropriate for an automotive interior application. One means of avoiding this problem while retaining the benefits of using a polyurethane in such applications is by using a plastic skin cladded polyurethane. For example, UK Patent Application 2 148 786 A discloses preparing a bathtub having a preformed acrylic shell and a polyurethane foam reinforcing layer. U.S. Pat. No. 4,784,904 to Wood, et al., discloses preparing an object such as a sink have an acrylic shell and a polyurethane foam reinforcing layer.

Similarly, flexible foams and semi-flexible foams can be prepared with plastic skins. However, preparing cladded polymers, particularly cladded foamed polymers is not always trouble free. One such problem occurs when adhesion between the polymer and the plastic skin fails. Gas can accumulate in the space between the skin and foam and form a raised area on the skin surface commonly called a "blister". Such blisters are serious aesthetic defects and can cause a part to be rejected which increases waste and lost production time. It would therefore be desirable in the art to prepare cladded polyurethane polymers which do not display this blistering phenomena.

SUMMARY OF THE INVENTION

In one aspect, the present invention is a plastic skin cladded polyurethane polymer comprising a plastic skin and, adherent thereto, a polyurethane prepared from a formulation including a polyisocyanate, a polyfunctional active hydrogen containing material and an adhesion improver having the general formula:

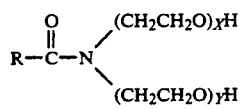

wherein R is an aliphatic group having from about 6 to about 24 carbons and X and Y are integers such that $0 < X+Y \leq 15$ and wherein the adhesion improver is present in an amount effective to prevent blistering.

In another aspect, the present invention is a method for preparing a plastic cladded polyurethane comprising applying to a plastic skin a polyurethane prepared from a formulation including a polyisocyanate, a polyfunctional active hydrogen containing material and an adhesion improver having the general formula:

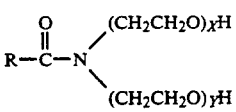

wherein R is an aliphatic group having from about 6 to about 24 carbons and X and Y are integers such that $0 < X+Y \leq 15$ and wherein the adhesion improver is present in an amount effective to prevent blistering.

The adhesion improver of the present invention is useful in concentrations of greater than about 8 percent by weight of the non-polyisocyanate portion of the polymer formulation for preventing blisters. Additionally, the adhesion improver can improve mold release and polyol compatibilization.

DESCRIPTION OF THE PREFERRED EMBODIMENTS

In one embodiment, the present invention is a plastic skin cladded polyurethane polymer comprising a plastic skin and, adherent thereto, a polyurethane prepared from a formulation including a polyisocyanate, a polyfunctional active hydrogen containing material and an adhesion improver. The plastic skins of the present invention can perform at least two functions. The first is to provide a suitable "show surface". In many applications of the present invention, the surface of the cladded foams is visible. For example, one application of the present invention is a polyvinyl chloride (hereinafter PVC) clad semi-rigid polyurethane door panel substrate. The outer texture and color of the door panel should match the other similar surfaces of the automobile interior. By using PVC to cover the outer, visible surface of the foam, the desirable properties of the foam including resiliency and comfort can be retained while the PVC is colored and textured to match other non-contact parts such as window and instrument panel moldings.

The plastic skins also can be employed to protect the polyurethane polymers from damaging environmental conditions. For example, the plastic skin can exclude moisture and ultraviolet radiation. The skin can also prevent abrasion in applications subject to abrading contact.

The plastic skins of the present invention can be any known to those skilled in the art of preparing cladded polyurethanes to be useful. For example, the skins can be prepared from thermoplastic urethanes (hereinafter TPU), thermoset urethanes, PVC, polyacrylates, polyolefins, acrylonitrile-butadiene-styrene (hereinafter ABS) and the like. Preferably, the skins are TPU, PVC, ABS and mixtures thereof.

The skins can be of any thickness suitable for the particular application in which they will be used. For example, the skin can be a film having a thickness of from about 0.05 mm to about 0.5 mm. Or the skin can be comparatively thick, having a thickness of from about 0.5 mm to 25 mm. The skin can be any thickness known to those skilled in the art of preparing plastic clad polyurethanes to be useful.

Adherent to the skin of the present invention is a polyurethane prepared form a formulation including a polyisocyanate, an active hydrogen containing material and an adhesion improver. The polyisocyanate component can be advantageously selected from organic polyisocyanates, modified polyisocyanates, isocyanatebased prepolymers, and mixtures thereof. These can include aliphatic and cycloaliphatic isocyanates, but aromatic and especially multifunctional aromatic isocyanates are preferred. Preferred are 2,4- and 2,6-toluenediisocyanate and the corresponding isomeric mixtures; 4,4'-, 2,4'- and 2,2'-diphenylmethanediisocyanate and the corresponding isomeric mixtures; mixtures of 4,4'-, 2,4'- and 2,2'-diphenylmethanediisocyanates and polyphenyl polymethylene polyisocyanates (PMDI); and mixtures of PMDI and toluene diisocyanates. Also useful for preparing the polyurethanes of the present invention are aliphatic and cycloaliphatic isocyanate compounds such as 1,6-hexamethylenediisocyanate; 1-isocyanato-3,5,5-trimethyl-1-3-isocyanatomethyl-cyclohexane; 2,4- and 2,6-hexahydrotoluenediisocyanate, as well as the corresponding isomeric mixtures; 4,4'-, 2,2'- and 2,4'-dicyclohexylmethanediisocyanate, as well as the corresponding isomeric mixtures.

Also advantageously used for the polyisocyanate component are the so-called modified multifunctional isocyanates, i.e., products which are obtained through chemical reactions of the above polyisocyanates. Exemplary are polyisocyanates containing esters, ureas, biorets, allophanates and preferably carbodiimides and/or uretonimines; isocyanurate and/or urethane group containing diisocyanates or polyisocyanates. Liquid polyisocyanates containing carbodiimide groups, uretonimine groups and/or isocyanurate rings, having isocyanate groups (NCO) contents of from 10 to 40 weight percent, more preferably from 20 to 35 weight percent, can also be used. These include, for example, polyisocyanates based on 4,4'-, 2,4'- and/or 2,2'-diphenylmethane diisocyanate and the corresponding isomeric mixtures, 2,4- and/or 2,6-toluenediisocyanate and the corresponding isomeric mixtures, 4,4'-, 2,4'- and 2,2'-diphenylmethanediisocyanate and the corresponding isomeric mixtures; mixtures of diphenylmethane diisocyanates and PMDI and mixtures of toluenediisocyanates and PMDI and/or diphenylmethane diisocyanates.

Suitable also are prepolymers having NCO contents of from 5 to 40 weight percent, more preferably from 15 to 30 weight percent. These prepolymers are prepared by reaction of the polyisocyanates with materials including lower molecular weight diols, triols, but also they can be prepared with multivalent active hydrogen compounds such as di- and tri-amines and diand tri-thiols. Individual examples are aromatic polyisocyanates containing urethane groups, preferably having NCO contents of from about 5 to about 40 weight percent, more preferably about 20 to 35 weight percent, obtained by reaction of diisocyanates and/or polyisocyanates with, for example, lower molecular weight diols, triols, oxyalkylene glycols, dioxyalkylene glycols or polyoxyalkylene glycols having molecular weights up to about 800. These polyols can be employed individually or in mixtures as di- and/or polyoxyalkylene glycols. For example, diethylene glycols, dipropylene glycols, polyoxyethylene glycols, polyoxypropylene glycols and polyoxypropylenepolyoxyethylene glycols can be used.

Particularly useful in the present invention are: (i) polyisocyanates having an NCO content of from 8 to 40 weight percent containing carbodiimide groups and/or urethane groups, from 4,4'-diphenylmethane diisocyanate or a mixture of 4,4'- and 2,4'-diphenylmethane diisocyanates; (ii) prepolymers containing NCO groups, having an NCO content of from 20 to 35 weight percent, based on the weight of the prepolymer, prepared by the reaction of polyoxy-alkylene polyors, having a functionality of preferably from 2 to 4 and a molecular weight of from about 800 to about 15,000 with 4,4'-diphenylmethane diisocyanate or with a mixture of 4,4'- and 2,4'-diphenylmethane diisocyanates and mixtures of (i) and (ii); and (iii) 2,4- and 2,6-toluenediisocyanate and the corresponding isomeric mixtures. PMDI in any of its forms can also be used and is preferred. In this case it preferably has an equivalent weight between about 125 and about 300, more preferably from about 130 to about 175, and an average functionality of greater than about 2. More preferred is an average functionality of from about 2.5 to about 3.5. The viscosity of the polyisocyanate component is preferably from about 25 to about 5,000 centipoise (cps) (0.025 to about 5 Pa.s), but values from about 100 to about 1,000 cps at 25° C. (0.1 to 1 Pa.s) are preferred for ease of processing. Similar viscosities are preferred where alternative polyisocyanate components are selected.

The polyurethane formulation of the present invention also include an active hydrogen containing material. Generally, in the practice of preparing polyurethanes, formulation components are separated into at least two groups. The first, often designated the "A side" consists of the polyisocyanate and any materials which are desirably not admixed with the active hydrogen containing material prior to forming a polyurethane. The "B side" consists of the active hydrogen containing materials as well as additives, catalysts and the like.

The active hydrogen containing compounds of the "B" component can be either the same as those used to prepare a prepolymer of the "A" component or they can be different. Active hydrogen containing compounds most commonly used in polyurethane production are those compounds having at least two hydroxyl groups. Those compounds are referred to herein as polyols. Representatives of suitable polyols are generally known and are described in such publications as *High Polymers*, Vol. XVI, "Polyurethanes, Chemistry and Technology" by Saunders and Frisch, Interscience Publishers, New York, Vol. I, pp. 32–42, 44–54 (1962) and Vol. II, pp. 5-6,198-199 (1964); *Organic Polymer Chemistry* by K. J. Saunders, Chapman and Hall, London, pp. 323–325 (1973); and *Developments in Polyurethanes*, Vol. I, J. M. Burst, ed., Applied Science Publishers, pp. 1–76 (1978). However, any active hydrogen containing compound can be used with the method of this invention.

Examples of such materials include those selected from the following classes of compositions, alone or in admixture: (a) alkylene oxide adducts of polyhydroxyalkanes; (b) alkylene oxide adducts of non-reducing sugars and sugar derivatives; (c) alkylene oxide adducts of phosphorus and polyphosphorus acids; and (d) alkylene oxide adducts of polyphenols. Polyols of these types are referred to herein as "base polyols". Examples of alkylene oxide adducts of polyhydroxyalkanes useful herein are adducts of ethylene glycol, propylene glycol, 1,3-dihydroxypropane, 1,4-dihydroxybutane, and 1,6-dihydroxyhexane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. Preferred herein as alkylene oxide adducts of polyhydroxyalkanes are the ethylene oxide adducts of trihydroxyalkanes. Other useful adducts include ethylene diamine, glycerin, ammonia, 1,2,3,4-tetrahydroxy butane, fructose, and sucrose.

Also preferred are poly(oxypropylene) glycols, triols, tetrols and hexols and any of these that are capped with ethylene oxide. These polyols also include poly(oxypropyleneoxyethylene)polyols. The oxyethylene content should preferably comprise less than about 80 weight percent of the total and more preferably less than about 40 weight percent. Ethylene oxide, when used, can be incorporated in any way along the polymer chain, for example, as internal blocks, terminal blocks, or randomly distributed blocks, or any combination thereof.

The base polyols described hereinabove can contain small amounts of "inherent" unsaturation, i.e., unsaturation due to the isomerization of propylene oxide to allyl alcohol during the manufacture of the polyol. In some cases it may be desirable to include additional unsaturation in the polyols.

Polyamines, amine-terminated polyols, polymercaptans and other isocyanate-reactive compounds are also suitable in the present invention. Polyisocyanate polyaddition active hydrogen containing compounds (PIPA) are particularly preferred for use with the present invention. PIPA compounds are typically the reaction products of TDI and triethanolamine. A method for preparing PIPA compounds can be found in, for example, U.S. Pat. No. 4,374,209, issued to Rowlands.

Another preferred class of polyols are "copolymer polyols", which are base polyols containing stably dispersed polymers such as acrylonitrile-styrene copolymers. Production of these copolymer polyols can be from reaction mixtures comprising a variety of other materials, including, for example, catalysts such as azobisisobutyronitrile; copolymer polyol stabilizers; and chain transfer agents such as isopropanol.

The polyurethane formulations of the present invention also include an adhesion improver. These materials serve several functions. The first and most important function of the adhesion improver is to increase the adhesion between the polyurethane and the plastic skin. By improving adhesion between these two components of the present invention, the adhesion improvers can also improve the surface quality of the plastic clad polyurethanes by decreasing blistering. With better adhesion between the skin and polyurethane there is less space available to trap gasses to form a blister.

The adhesion improvers of the present invention have the general formula:

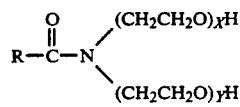

wherein R is an aliphatic group having from about 6 to about 24 carbons, preferably from about 8 to about 20 carbons, and X and Y are integers such that $0 < X + Y \leq 15$. Preferably X and Y are $> 0$. Also preferably, R contains unsaturation. Wherein R has at least one unsaturated bond, $X + Y$ can be $\leq 15$. Wherein R is completely saturated, $X + Y$ is preferably less than 10 and more preferably less than 5.

The adhesion improvers of the present invention can be prepared in any manner as long as they correspond to the general formula above. However, preferably, they are the amide derivatives of fatty acids. Preferably the adhesion improvers are prepared from oleic acid, palmitic acid, myristic acid, lauric acid and the like. Even more preferably, they are prepared from mixtures of acids such as the hydrolysis products of animal or vegetable oils such as tallow, coconut or soya oil. Where the adhesion improvers of the present invention are prepared from acids derived from natural oils, preferably they are prepared from coconut oil acids.

The adhesion improvers of the present invention can be combined with the other polyurethane formulation components of the present in any way known to be useful to those skilled in the art of preparing polyurethanes to be useful. For example, in a formulation which has only an A and a B side, the adhesion improver can be combined with the B side components or it can be admixed concurrently with the A and B side as a separate stream. Preferably, the adhesion improver and the A side are not combined prior to the forming of a polyurethane. However, the adhesion improver is reactive with isocyanates and can be added to the A side if it is done carefully with constant stirring to evenly distribute the adhesion improver throughout the A side.

The adhesion improvers of the present invention are added to the polyurethane formulation of the present invention in an amount effective to prevent the formation of blisters on the surface of a plastic cladded polyurethane. The adhesion improvers are added to the polyurethane formulation at a concentration of from about 5 to about 30 weight percent of the total weight of isocyanate reactive materials. Preferably the adhesion improvers are added to the polyurethane formulation at a concentration of from about 8 to about 20 weight percent of the total weight of isocyanate reactive materials. Even more preferably, the adhesion improvers are added to the polyurethane formulation at a concentration of from about 8 to about 15 weight percent of the total weight of isocyanate reactive materials.

The polyurethanes of the present invention can be prepared and applied to the plastic skins of the present invention by any means known to be useful to those skilled in the art of preparing plastic skin cladded polyurethanes. For example, the polyurethane formulation components can be combined and admixed by means of a mechanical mixer and poured onto the plastic skin. Alternatively, the mixing can be done by means of an impingement mixer. In one preferred embodiment the polyurethane is prepared with a reaction injection molding (hereinafter RIM) apparatus wherein the skin is placed into the mold prior to injection of a forming polyurethane.

The RIM process is well known in the art of preparing polyurethane polymers. However, generally, a RIM process relates to a process whereby two or more highly reactive streams are brought together under high pressure in a small mixing chamber. The material mixes and flows immediately into a warm mold where the chemical reaction is completed sufficiently to allow removal of the part from the mold. The streams are, in the case of the present invention, a polyisocyanate stream designated the "A" stream and one or more streams containing isocyanate reactive materials and additives designated collectively as the "B" component or stream. In closed mold RIM, the mold is composed such that the forming polymer, upon entering the mold, pushes the air from the mold resulting in a polymer substantially free of trapped air. RIM can also be performed in an open mold process.

The adhesion improvers of the present invention can also improve the mold release properties of the polyurethanes prepared therewith. Mold release is a persistent problem with molded polyurethanes, particularly with polyurethane foams. The polyurethane must be left in a mold until it has cured sufficiently to allow its removal without deforming the molded part. The greater the force needed to remove the polyurethane molded part, the longer the time required for the part to cure sufficiently to withstand the force needed to remove it from the mold. Time spent allowing the part to cure within the mold increase production time and thereby production cost. Remedies to this problem include the use of both internal and external mold release materials which can be both expensive and impart undesirable properties to the molded polyurethane part. Therefore, desirably, the polyurethanes prepared with adhesion improvers of the present invention can be removed from a mold more times without recourse to another internal or an external mold release agent than similar polyurethanes prepared without the adhesion improvers.

One preferred embodiment of the present invention is a plastic skin cladded polyurethane foam. Foamed polyurethanes are prepared by including a blowing agent in the formulation. Any blowing agent or mixture thereof is suitable for use in the practice of the invention. Suitable blowing agents include inorganic blowing agents such as water, organic blowing agents which are volatile at reaction temperatures and dissolved inert gases. Suitable organic blowing agents include acetone; ethyl acetate; methanol; ethanol; halogen-substituted alkanes such as methylene chloride, chloroform, ethylidene chloride, vinylidene chloride, monofluorotrichloromethane, chlorodifluoromethane, dichlorodifluoromethane, hydrohalogenated ethanes and the like; butane; hexane; heptane; diethyl ether; and the like. Gases inert to the starting components such as nitrogen, air, carbon dioxide and the like are also useful blowing agents. Compounds, such as azides, which decompose at suitable temperatures to produce gases such as nitrogen are also useful. Preferred blowing agents are compounds which boil between about $-50°$ and $100°$ C.

The amount of blowing agent employed is not critical to the invention, but is preferably sufficient to foam the reaction mixture. The amount will vary with factors such as the density desired in a foamed product.

Water is a useful blowing agent for use in the practice of the present invention and is preferred. In addition to generating carbon dioxide gas for foaming, water reacts quickly with polyisocyanate components, thus contributing to early polymer strength needed for gas retention. Generally, when water is used, it is present in proportions of from about 0.5 to about 8 weight percent of water based on total weight of active hydrogen components. Other blowing agents, can be used in combination with water.

In addition to the higher molecular weight active hydrogen containing materials already described herein, the present invention can be prepared with polyurethane formulations also including lower molecular weight chain extenders and crosslinkers. These are active hydrogen containing materials having difunctionality in the case of extenders and tri- or greater functionality in the case of crosslinkers. Generally, they have a molecular weight of from about 40 to about 200. Examples of these compounds include ethylene glycol, diethylene glycol, propylene glycol, diethytoluenediamine and the like.

In the case of some of the chain extenders, especially low molecular weight glycols such as ethylene glycol, butane diol, diethylene glycol, and the like, there can be an incompatibility with the higher molecular base polyols. This can often be undesirable. Upon storage, these components can separate and, if not remixed prior to use, cause the production of poorly formed or out of specification polyurethane parts. The adhesion improvers of the present invention can improve the compatibility of some of the extenders, particularly ethylene glycol, with base polyols.

The polyurethane of the present invention are suitably prepared with other additives known to be useful to those skilled in the art of preparing polyurethanes. For example, polyurethane catalysts are also suitably used with the present invention. The catalyst is preferably incorporated in the formulation in an amount suitable to increase the rate of reaction between the isocyanate groups of the composition of the present invention and a hydroxyl-reacting species. Although a wide variety of materials is known to be useful for this purpose, the most widely used and preferred catalysts are the tertiary amine catalysts and the organotin catalysts.

Examples of the tertiary amine catalysts include, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-diethyl-3-diethyl aminopropylamine, dimethylbenzyl amine and the like. Tertiary amine catalysts are advantageously employed in an amount from about 0.01 to about 2 percent by weight of the polyol formulation.

Examples of organotin catalysts include dimethyltin dilaurate, dibutyltin dilaurate, dioctyltin dilaurate, stannous octoate and the like. Other examples of effective catalysts include those taught in, for example, U.S. Pat. No. 2,846,408. Preferably the organotin catalyst is employed in an amount from about 0.001 to about 0.5 percent by weight of the polyol formulation.

Suitable catalysts for use with the present invention can also include those which catalyze the formation of isocyanurates such as those mentioned in Saunders and Frisch, *Polyurethanes, Chemistry and Technology* in 1 *High Polymers* Vol. XVI, pp. 94–97 (1962). Such catalysts are referred to herein as trimerization catalysts. Examples of these catalysts include aliphatic and aromatic tertiary amine compounds, organometallic compounds, alkali metal salts of carboxylic acids, phenols and symmetrical triazine derivatives. Preferred catalysts are potassium salts of carboxylic acids such as potassium octoate and tertiary amines such as, for instance, 2,4,6-tris(dimethyl aminomethyl) phenol.

Other additives suitably included with the present invention can include, for example, surfactants, ultraviolet light stabilizers, molecular weight extenders, pigments, fire retardants and the like. Fillers are particularly useful with the present invention. Chopped glass fibers, milled glass fiber, mica, wollastonite and the like are particularly useful. Structural reinforcements such as mat substrates can be used with the present invention. Glass fiber mat molding RIM clad with PVC skins is a useful embodiment of the present invention. These materials are all well known in the art. Any additive known to those skilled in the art to be useful in preparing polyurethanes, particularly reinforced polyurethanes can be included in the polyurethane formulations of the present invention.

The polyurethanes of the present invention can be prepared with any of the above active hydrogen containing compounds and an adhesion improver. For example, one preferred embodiment, a PVC clad semirigid polyurethane can be prepared with a high molecular weight polyol, an adhesion improver, and, optionally, a crosslinker and or a compatibilizer. Preferably the high molecular weight polyol is a diol or triol or mixture thereof. It can have a molecular weight of greater than about 3,000. More preferably, the high molecular weight polyol has a molecular weight of than about 4,000. Also preferably, the polyol can be amine initiated.

The following examples are provided to illustrate the present invention. The examples are not intended to limit the scope of the present invention and they should not be so interpreted. Amounts are in weight parts or weight percentages unless otherwise indicated.

EXAMPLE 1

A PVC cladded semirigid polyurethane foam is prepared by admixing 51.03 parts of a 1,650 molecular weight ethylene oxide capped propylene oxide polyether triol; 18.4 parts of a 87 equivalent weight amine initiated polyether polyol having a functionality of 3-4; 4 parts of a 100 equivalent weight amine terminated polyol having a nominal functionality of 4; 13.2 parts of ethylene glycol; 1.5 part water; 0.6 parts tris (dimethyl aminopropyl) amine (catalyst); 0.2 parts pentamethyl-diethylene triamine catalyst; 1.5 parts silicone surfactant and 15 parts oleic diethanolamide adhesion improver* (*COMPERLAN OD which is a trade designation of Henkel Chemical Company). The B side is allowed to stand for about 72 hours and is then observed for phase separation of the ethylene glycol. No observed separation indicates that the ethylene glycol has been compatibilized. Separation indicates that the ethylene glycol has not been compatibilized. Results are reported in Table 1. 70 parts of this admixture is further admixed with 30 parts 1/16 inch (1.5 mm) milled glass fiber to form a B side. A polyurethane is then prepared by admixing 84 parts Polymethylene polyphenyl Polyisocyanate having an equivalent weight of about 135 and an average functionality of about 2.7 with 100 parts of B side. The A and B sides are admixed by stirring for about 5 seconds with a 2 inch (5.1 cm) mixer at about 2,500 rpm. The forming polyurethane is poured onto a PVC skin already placed within an 8 inch (20.3 cm) by 8 inch (20.3 cm) by 0.25 inch (0.62 cm) mold which has been sprayed with an external mold release. The mold is closed and the polyurethane allowed to cure for about 120 seconds. The mold is opened and the PVC cladded polyurethane is visually examined for blistering. Results are reported in Table 1. The process of forming the polyurethane and removing it from the mold is repeated until the polyurethane tears instead of being successfully removed from the mold. The number of successful demoldings is reported in Table 1.

EXAMPLE 2

Example 1 is repeated substantially identically except that 10 parts of oleic diethanolamide adhesion improver is used instead of 15 parts.

COMPARATIVE EXAMPLE 3

Example 1 is repeated substantially identically except that 5 parts of oleic diethanolamide adhesion improver is used instead of 15 parts.

EXAMPLE 4

Example 1 is repeated substantially identically except that an adhesion improver is used which is prepared by forming the diethanol amide of coconut oil acids* (*VARAMIDE MA-1 which is a trade designation of Sherex Chemical Company, Inc.).

EXAMPLE 5

Example 4 is repeated substantially identically except that 10 parts of the coconut oil acid diethanol amide is used instead of 15 parts.

COMPARATIVE EXAMPLE 6

Example 4 is repeated substantially identically except that 5 parts of the coconut oil acid diethanol amide is used instead of 15 parts.

EXAMPLE 7

Example 1 is repeated substantially identically except that the adhesion improver has the formula:

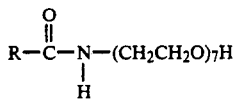

wherein R results from the reaction of the indicated ethanolamine with oleic acid (EHTHOMID 0/17 which is a trade designation of Akzo Chemicals, Inc.).

TABLE 1

|  | COMPATI-BILIZES ETHYLENE GLYCOL | PREVENTS BLISTER-ING | NUMBER OF RELEASES |
|---|---|---|---|
| EXAMPLE 1 | + | + | — |
| EXAMPLE 2 | + | + | 7 |
| COMPARATIVE EXAMPLE 3 | — | — | — |
| EXAMPLE 4 | + | + | — |
| EXAMPLE 5 | + | + | 11 |
| COMPARATIVE EXAMPLE 6 | — | — | — |
| EXAMPLE 7 | + | + | 4 |

The symbol "+" in this Table indicates that the example either compatibilizes ethylene glycol or that the example had no blisters.
The symbol "—" in this Table indicates that the example either does not compatibilize ethylene glycol or that the example had blisters.
The symbol "—" indicates no data available.

EXAMPLE 8

A low density reinforced RIM polyurethane pvc cladded plaque is prepared by admixing 51.14 parts of a 1,650 molecular weight ethylene oxide capped propylene oxide polyether triol, 18.36 parts of a 87 equivalent weight amine initiated polyether polyol having a functionality of 3-4, 4 parts of a 100 equivalent weight amine terminated polyol having a nominal functionality of 4, 13.2 parts of ethylene glycol, 1.0 part water, 0.6 parts tris (dimethyl aminopropyl) amine (catalyst), 0.2 parts pentamethyl-diethylene triamine catalyst, 1.5 parts silicone surfactant and 10 parts oleic diethanolamide adhesion improver* (*COMPERLAN OD which is a trade designation of Henkel Chemical Company). 70 parts of this admixture is further admixed with 30 parts 1/16 inch (1.5 mm) milled glass fiber to form a B side.

The B side above is combined 86 parts polymethylene polyphenyl polyisocyanate having an equivalent weight of about 135 and an average functionality of about 2.7 by means of a RIM machine as detailed in Table 2 below. The mold contains a PVC skin. The part is formed and analyzed for physical properties which are recorded in Table 3 below.

TABLE 2

| RIM MACHINE | HF-10 lance cylinder machine HF-10 is a trade designation of the Canon Equipment Company) |
|---|---|
| A SIDE TEMPERATURE | 105° F. (50° C.) |
| B SIDE TEMPERATURE | 122° F. (40° C.) |
| IMPINGEMENT PRESSURE | 2000 psi (141 kg/cm²) |
| THROUGHPUT TOTAL | 4 lbs/sec (1.8 kg/sec) |
| MOLD | 23"× 40" × 0.14" (58 cm × 101.6 cm × 3.5 mm) center grated chrome polished steel plaque tool |
| MOLD TEMPERATURE | 140° F. (60° C.) |

TABLE 3

| Specific Gravity | 0.58 g/cm |
|---|---|
| Thickness | 0.14 inches (3.5 mm) |
| Flexural Modulus[1] | 100 kpsi (7,030 kg/cm²) |
| Tensile[2] | 1858 psi (131 kg/cm²) |
| Heat Sag[3] @ 250° F. (121° C.) | 37 mm |
| Heat Distortion[4] | 160° F. (71° C.) |
| Percent Glass | 15.9 |

[1]ASTM D 790-91 Standard Test Methods For Flexural Properties of Unreinforced and Reinforced Plastics and Electrical Insulation Materials.
[2]ASTM D 638-91 Standard Test Method for Tensile Properties of Plastics.
[3]ASTM D 3769-85 (Reapproved 1990) Standard Method for Testing Microcellular Urethanes-High-Temperature Sag.
[4]ASTM D 648-82 (Reapproved 1988) Standard Test Method for Deflection Temperature of Plastics Under Flexural Load.

What is claimed is:

1. A plastic skin cladded polyurethane polymer comprising a plastic skin and, adherent thereto, a polyurethane prepared from a formulation including a polyisocyanate, a polyfunctional active hydrogen containing material and an adhesion improver having the general formula:

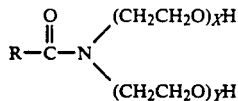

wherein R is an aliphatic group having from about 6 to about 24 carbons and X and Y are integers such that $0 < X+Y \leq 15$ and wherein the adhesion improver is present in an amount effective to prevent blistering.

2. The plastic skin cladded polyurethane polymer of claim 1 wherein the plastic skin is a thermoplastic urethane, a thermoset urethane, polyvinyl chloride, a polyacrylate, a polyolefin, an acrylonitrile-butadiene-styrene or mixtures thereof.

3. The plastic skin cladded polyurethane polymer of claim 2 wherein the plastic skin is a thermoplastic urethane, polyvinyl chloride, or acrylonitrile-butadiene-styrene.

4. The plastic skin cladded polyurethane polymer of claim 1 wherein the plastic skin has a thickness of from about 0.05 mm to about 25 mm.

5. The plastic skin cladded polyurethane polymer of claim 4 wherein the plastic skin has a thickness of from about 0.5 mm to about 25 mm.

6. The plastic skin cladded polyurethane polymer of claim 1 wherein the polyisocyanate is toluenediisocyanate, diphenylmethanediisocyanate, polymethylene polyphenyl polyisocyanate or mixtures thereof.

7. The plastic skin cladded polyurethane polymer of claim 6 wherein the polyisocyanate is diphenylmethanediIsocyanate, polymethylene polyphenyl polyisocyanate or mixtures thereof.

8. The plastic skin cladded polyurethane polymer of claim 1 wherein the polyfunctional active hydrogen containing material is a base polyol, polyamine or mixtures thereof.

9. The plastic skin cladded polyurethane polymer of claim 8 wherein the polyfunctional active hydrogen containing material is a base polyol.

10. The plastic skin cladded polyurethane polymer of claim 1 wherein the adhesion improver has from about 8 to about 20 carbons, X and Y are $>0$, and R has at least one unsaturated bond.

11. The plastic skin cladded polyurethane polymer of claim I wherein the adhesion improver is prepared from the hydrolysis products of a tallow, coconut, or soya oil.

12. The plastic skin cladded polyurethane polymer of claim 1 wherein the adhesion improver is prepared from the hydrolysis products coconut oil.

13. The plastic skin cladded polyurethane polymer of claim 1 wherein the polyurethane formulation includes an adhesion improver at a concentration of from about 5 to about 30 weight percent of the total weight of the isocyanate reactive materials.

14. The plastic skin cladded polyurethane polymer of claim 13 wherein the polyurethane formulation includes an adhesion improver at a concentration of from about 8 to about 20 weight percent of the total weight of the isocyanate reactive materials.

15. The plastic skin cladded polyurethane polymer of claim 14 wherein the polyurethane formulation includes an adhesion improver at a concentration of from about 8 to about 15 weight percent of the total weight of the isocyanate reactive materials.

16. A method for preparing a plastic cladded polyurethane comprising applying to a plastic skin a polyurethane prepared from a formulation including a polyisocyanate, a polyfunctional active hydrogen containing material and an adhesion improver having the general formula:

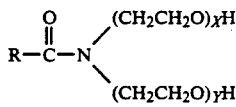

wherein R is an aliphatic group having from about 6 to about 24 carbons and X and Y are integers such that $0 < X+Y \leq 15$ and wherein the adhesion improver is present in an amount effective to prevent blistering.

17. The method of claim 16 wherein the adhesion improvers are from about 5 to about 30 weight percent of the total weight of the isocyanate reactive materials of the polyurethane formulation.

18. The method of claim 17 wherein the adhesion improvers are from about 8 to about 20 weight percent of the total weight of the isocyanate reactive materials of the polyurethane formulation.

19. The method of claim 18 wherein the adhesion improvers are from about 8 to about 15 weight percent of the total weight of the isocyanate reactive materials of the polyurethane formulation.

20. The method of claim 16 wherein the polyurethane is applied to the plastic skin by reaction injection molding.

* * * * *